United States Patent [19]
Hayashi et al.

[11] Patent Number: 5,803,323
[45] Date of Patent: Sep. 8, 1998

[54] STRUCTURE OF CARRYING CASE FOR ELECTRONIC EQUIPMENT

[75] Inventors: Takahiro Hayashi; Haruo Hayakawa, both of Yokohama, Japan

[73] Assignee: Matsushita Electric Industrial Co., Ltd., Japan

[21] Appl. No.: 929,683

[22] Filed: Sep. 15, 1997

[30] Foreign Application Priority Data

Sep. 30, 1996 [JP] Japan .................................. 8-258805

[51] Int. Cl.⁶ ........................................................ A45F 5/00
[52] U.S. Cl. ........................ 224/241; 224/666; 224/240; 224/679; 224/930; 200/333; 206/320; 455/351
[58] Field of Search .................................... 224/240, 241, 224/666, 679, 930; 200/333, 332.1; 206/320, 305; 455/351, 346, 344, 347

[56] References Cited

U.S. PATENT DOCUMENTS

| | | | |
|---|---|---|---|
| 4,770,328 | 9/1988 | Dickhudt et al. | 224/930 |
| 5,452,829 | 9/1995 | King et al. | 224/269 |
| 5,666,273 | 9/1997 | Kurchart | 455/347 |

*Primary Examiner*—Linda J. Sholl
*Attorney, Agent, or Firm*—Parkhurst & Wendel, L.L.P.

[57] ABSTRACT

A carrying case for portable electronic equipment is provided which is designed to allow a case carrier to stop an alarm or call sound produced from the electronic equipment without opening the carrying case. The carrying case has a protrusion formed on an inner wall of a cover at a given interval away from an operating button on the electronic equipment disposed within the carrying case. The cover is supported elastically by a case body with a given gap between front edges of the cover and the case body. The depression of the operating button of the electronic equipment through the protrusion to stop the alarm or call sound is achieved by pressing one of the cover and the case body against the other to decrease the gap therebetween. In another modified form, a window is formed in the bottom of the case body for allowing the case carrier to move the electronic equipment within the case body using a finger load, thereby bringing the operating button into engagement with the protrusion on the inner wall of the cover.

8 Claims, 4 Drawing Sheets

STRUCTURE OF CARRYING CASE FOR ELECTRONIC EQUIPMENT

BACKGROUND OF THE INVENTION

1. Technical Field of the Invention

The present invention relates generally to a carrying case for portable electronic equipment, and more particularly to an improved structure of a carrying case for portable electronic equipment capable of depressing an operating button provided on the electronic equipment stored in the carrying case from the outside.

2. Background of Related Art

FIGS. 4(a) to 4(c) show one example of conventional carrying cases for portable electronic equipment.

The carrying case includes a box-like case body 3 and a cover 4. The portable electronic equipment 1 is held within the case body 3 in engagement of recessed portions 1a and 1b formed in side walls thereof with protrusions 3a and 3b formed on inner side walls of the case body 3. The cover 4 is connected to the case body 3 through a hinge 5. When the cover 4 is closed, a claw 4a formed on a side wall thereof opposed to the hinge 5 firmly engages a claw 3c formed on the case body 3. A hook 6 is installed on the cover 4 so as to be rotatable about a shaft 7 mounted on an end of the hook 6 and has a spring 8 which urges the other end of the hook 6 into constant engagement with the cover 4. The hook 6 serves to hold part of clothes of a case carrier between itself and the cover 4 for carrying the electronic equipment.

When it is required to operate the electronic equipment 1, the claw 3c of the case body 3 is released from the claw 4a of the cover 4 to turn the case body 3 about the hinge 5, thereby exposing the electronic equipment to atmosphere while the carrying case is held by the case carrier through the holder 6.

The above conventional carrying case, however, has the drawback in that when an alarm or call sound is produced from the electronic equipment 1 during carrying thereof, depression of the operating buttons 2 to stop it always requires release of the claw 4a from the claw 3c to expose the electronic equipment 1 to atmosphere.

SUMMARY OF THE INVENTION

It is therefore a principal object of the present invention to avoid the disadvantages of the prior art.

It is another object of the present invention to provide a carrying case for electronic equipment which is capable of stopping an alarm or call sound generated from the electronic equipment while it is stored in the carrying case.

According to one aspect of the present invention, there is provided a carrying case for electronic equipment which comprises: (a) a case body having a first edge portion and a second edge portion opposite to the first edge portion to define an opening; (b) a cover covering the opening of the case body, the cover having a first edge portion and a second edge portion opposite to the first edge portion; (c) a hinge connecting the first edge portions of the case body and the cover so as to allow the cover to be opened and closed; (d) an engaging means for engaging the second edge portion of the cover with the second edge portion of the case body with a gap therebetween; (e) an urging means for urging the second edge portion of the cover away from the second edge portion of the case body so as to keep the gap constant in engagement of the second edge portions of the case body and the cover through the engaging means; and (f) an inner wall provided on the cover at a given interval away from a preselected operating button on the electronic equipment put in the case body when the cover is closed, the inner wall depressing the preselected operating button when a load is provided to at least one of the case body and the cover so as to decrease the gap between the second edge portions of the case body and the cover.

In the preferred mode of the invention, a hook is further provided on the cover which has a first end portion and a second end portion opposite to the first end portion. The first end portion is installed pivotably on the cover, while the second end portion is spring-loaded into constant engagement with the cover.

The urging means is a spring member provided on the second edge portion of the cover.

The urging means may alternatively be a spring member provided on the first end portions of the case body and the cover.

The inner wall has formed thereon a protrusion in alignment with and at a given interval away from the operating button of the electronic equipment stored within the case body.

According to another aspect of the present invention, there is provided a carrying case for electronic equipment which comprises: (a) a case body having a bottom, a first side wall, and a second side wall opposite to the first side wall, the first side wall and the second side wall having a first edge portion and a second edge portion to define an opening opposite the bottom, the case body being designed to store therein the electronic equipment to be movable a given distance in a widthwise direction between the bottom and the opening; (b) a cover covering the opening of the case body, the cover having a first edge portion and a second edge portion opposite to the first edge portion; (c) a hinge connecting the first edge portions of the case body and the cover so as to allow the cover to be opened and closed; (d) an engaging means for engaging the second edge portion of the cover with the second edge portion of the case body; (e) an urging means for urging the electronic equipment stored within the case body against the bottom of the case body to hold the electronic equipment in the case body; (f) a window formed in the bottom of the case body to expose a portion of the electronic equipment stored in the case body to atmosphere; and (g) an inner wall provided on the cover at a given interval away from a preselected operating button of the electronic equipment stored in the case body when the cover is closed, when a load is provided to the portion of the electronic equipment through the window to move the electronic equipment away from the bottom of the case body against pressure exerted by the urging means, the preselected operating button of the electronic equipment being brought into engagement with the inner wall so that the preselected operating button is depressed.

In the preferred mode of the invention, the urging means is a spring member provided on the engaging means which provides a spring load to a portion of the electronic equipment to hold the electronic equipment in the case body when the second edge portion of the cover engages the second edge portion of the case body.

The inner wall has formed thereon a protrusion in alignment with and at a given interval away from the operating button of the electronic equipment stored within the case body.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1A:
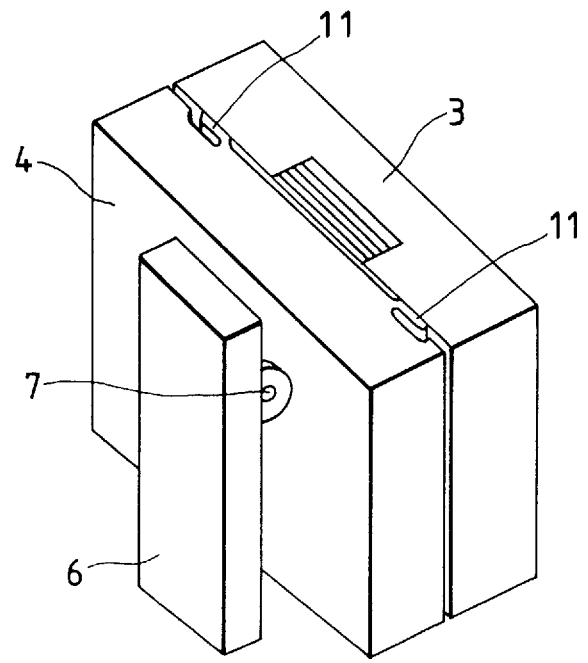
FIG. 1(a) is a perspective view which shows a carrying case for portable electronic equipment according to the first embodiment of the invention.
Figure 1B:
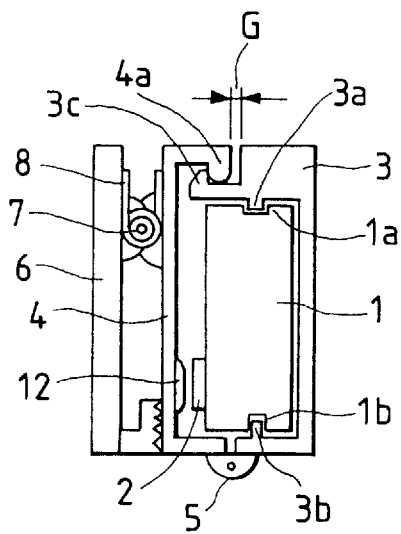
FIG. 1(b) is a cross sectional view which shows the carrying case in FIG. 1(a)

Referring now to the drawings, particularly to FIGS. 1(a) and 1(b), there is shown a carrying case for portable electronic equipment according to the first embodiment of the invention.

The carrying case generally includes a box-like case body 3 and a cover 4. The case body 3 has an opening and stores therein the portable electronic equipment 1 in engagement of recessed portions 1a and 1b formed in side walls of the electronic equipment 1 with protrusions 3a and 3b formed on inner side walls of the case body 3. The cover 4 is connected at a rear edge thereof to the case body 3 through a hinge 5. When the cover 4 is closed, a claw 4a formed on a front edge thereof firmly engages a claw 3c formed on a front edge of the case body 3. A hook 6 is installed on an upper surface of the cover 4 so that it may swing about a shaft 7 supported by bearings formed on the hook 6 and the cover 4. A spring 8 is installed on the shaft 7 to urge the front end of the hook 6 into constant engagement with the upper surface of the cover 4. The hook 6 serves as a clip to hold part of clothes of a case carrier between itself and the cover 4 for carrying the electronic equipment 1.

When the cover 4 is closed, the front thereof is connected to the front of the case body 3 through engagement of claws 4a and 3c at a given gap or interval G between the front edges of the cover 4 and the case body 3. The cover 4 has formed on its edge C-shaped spring portions 11, as shown in FIG. 1(a), which provide spring loads to a counter edge of the case body 3 when the cover 4 is closed. The cover 4 also has formed on its inner wall at least one protrusion 12 in alignment with and at a given interval away from an operating button 2 on the electronic equipment 1 when disposed within in the case body 3.

The spring portions 11 may alternatively be formed integrally on the edge of the case body 3 or provided by installing separate elastic members on the edge of the cover 4 or the case body 3.

When the electronic equipment 1 is put into the carrying case, it is first fitted into the case body 3 in engagement of the recessed portions 1a and 1b formed in the side walls of the electronic equipment 1 with the protrusions 3a and 3b formed in the inner side walls of the case body 3. Next, the cover 4 is closed, and the claw 4a is brought into engagement with the claw 3c of the case body 3. This causes the spring portions 11 of the cover 4 to press the front edge of the case body 3 to form the gap G between the front edges of the cover 4 and the case body 3. The carrying case may be fastened to clothes of a case carrier by holding part of the clothes between the case 4 and the hook 6.

When an alarm or call sound is generated during carrying of the electronic equipment 1, it may be stopped in the following manner. The bottom of the case body 3 is pressed against the cover 4, which causes the spring portions 11 of the cover 4 to be deformed or compressed, decreasing the gap G between the front edges of the cover 4 and the case body 3. This causes the protrusion 12 to depress the operating button 2 of the electronic equipment 1, thereby stopping the alarm or call sound generated from the electronic equipment 1. When it is required to operate the electronic equipment 1, the claw 4a of the cover 4 is released from the claw 3c of the case body 3 to expose an operating panel of the electronic equipment 1 to atmosphere.

Figure 2A:
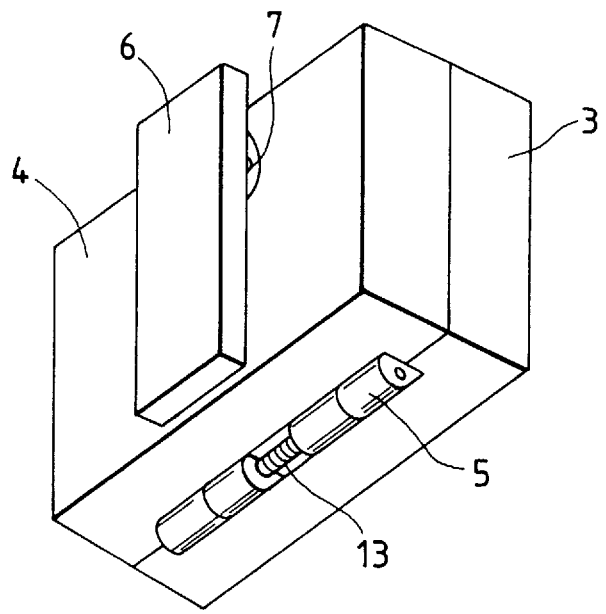
FIG. 2(a) is a perspective view which shows a carrying case for portable electronic equipment according to the second embodiment of the invention.
Figure 2B:
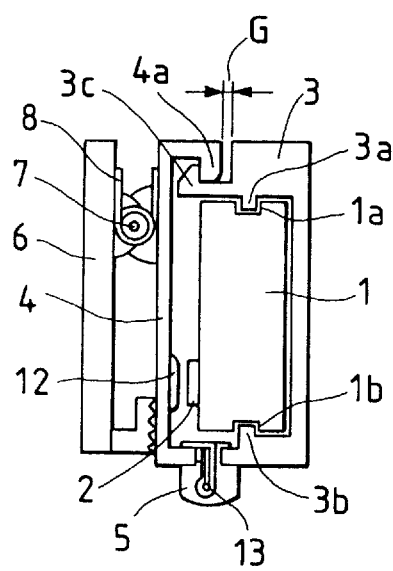
FIG. 2(b) is a cross sectional view which shows the carrying case in FIG. 2(a)

FIGS. 2(a) and 2(b) show the second embodiment of the carrying case according to the present invention. The same reference numbers as employed in FIGS. 1(a) and 1(b) refer to the same parts, and explanation thereof in detail will be omitted here.

A spring 13 is installed on edges portions of the case body 3 and the cover 4 adjacent the hinges 5 and urges the front of the cover 4 away from the case body 3. This structure keeps the gap G between the front edges of the cover 4 and the case body 3 constant when the cover 4 is closed in engagement of the claw 4a with the claw 3c without need for the spring portions 11 used in the first embodiment.

Figure 3A:
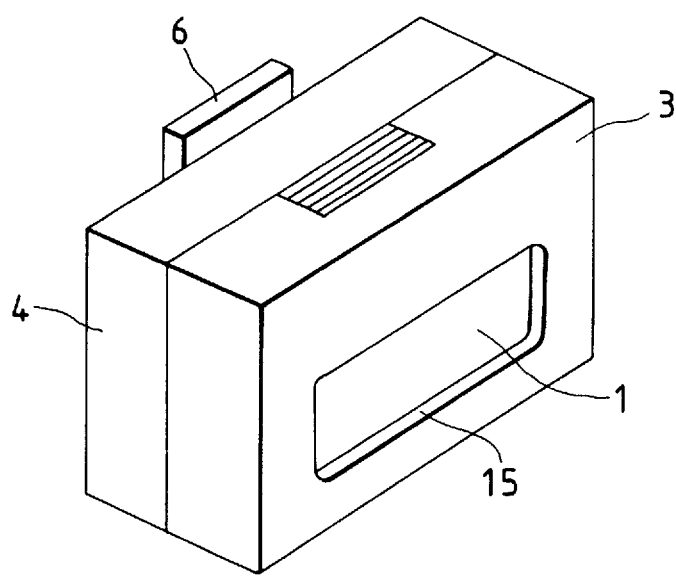
FIG. 3(a) is a perspective view which shows a carrying case for portable electronic equipment according to the third embodiment of the invention.
Figure 3B:
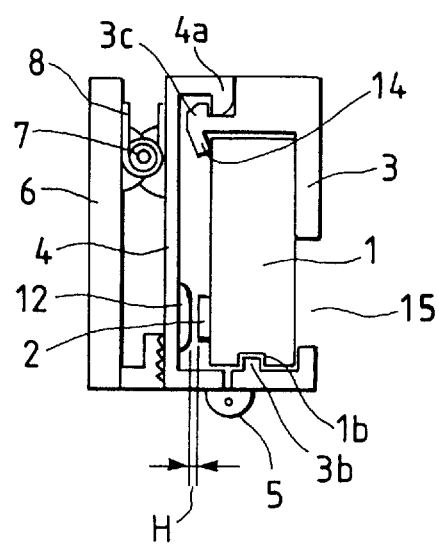
FIG. 3(b) is a cross sectional view which shows the carrying case in FIG. 3(a)
Figure 4A:
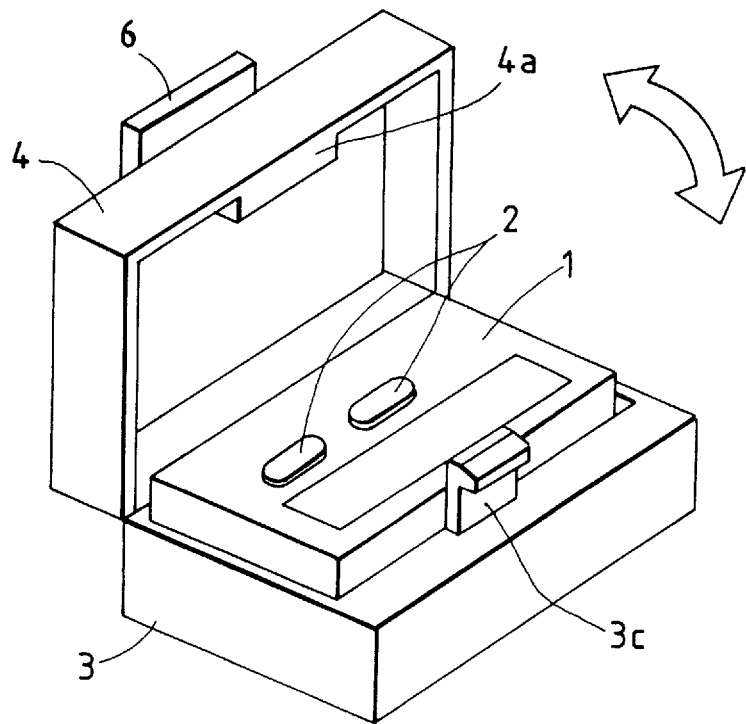
FIG. 4(a) is a perspective view which shows a conventional carrying case for portable electronic equipment when a cover is opened.
Figure 4B:
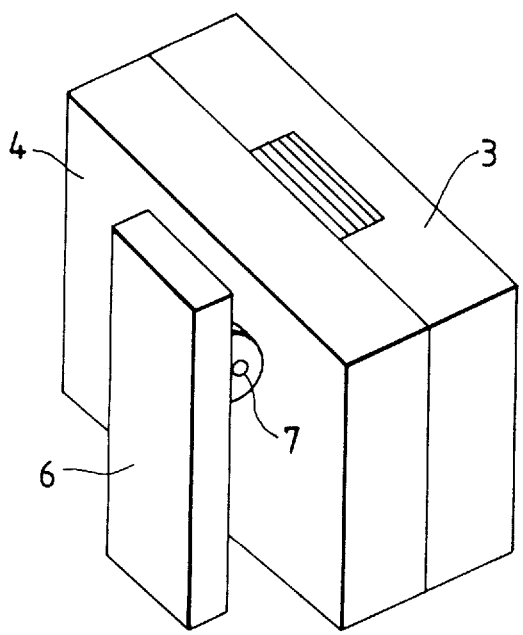
FIG. 4(b) is a perspective view which shows the conventional carrying case in FIG. 4(a) when the cover is closed.
Figure 4C:
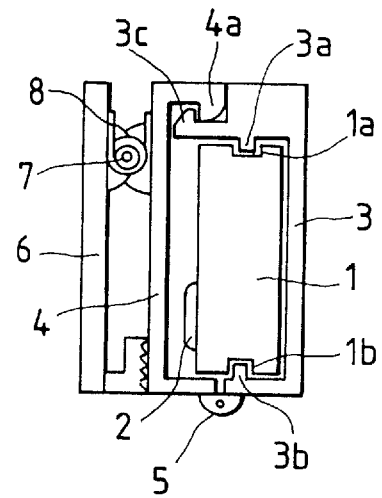
FIG. 4(c) is a cross sectional view which shows the carrying case in FIG. 4(b).

FIGS. 3(a) and 3(b) show the third embodiment of the carrying case according to the invention. The same reference numbers as employed in FIGS. 1(a) and 2(b) refer to the same parts, and explanation thereof in detail will be omitted here.

The case body 3 has formed in the bottom thereof a rectangular opening or window 15 for exposing part of the bottom of the electronic equipment 1 to atmosphere. The claw 3c formed on the front edge of the case body 3 has, as clearly shown in FIG. 3(b), an elastic hook 14 extending inward. When the electronic equipment 1 is put in the case body 3 with the recessed portion 1b thereof engaging the protrusion 3b of the case body 3, the elastic hook 14 elastically presses a front corner of the electronic equipment 1 against the bottom of the case body 3 to hold the electronic equipment 1 within the case body 3 without any play.

The operating button 2 of the electronic equipment 1 is placed at a given gap H away from the protrusion 12 formed on the inner wall of the cover 4.

When an alarm or call sound is produced during carrying of the electronic equipment 1, it may be stopped in the following manner. The bottom of the electronic equipment 1 is pressed by, for example, a finger of a case carrier through the window 1 of the case body 3 against the spring pressure of the hook 14. This causes the electronic equipment 1 to swing around the protrusion 3b of the case body 3 engaging the recesses portion 1b of the electronic equipment 1, thereby bringing the operating button 2 into engagement with the protrusion 12 of the cover 4 so that the operating button 2 is depressed to stop the alarm or call sound.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A carrying case for electronic equipment comprising:

a case body having a first edge portion and a second edge portion opposite to the first edge portion to define an opening;

a cover covering the opening of said case body, said cover having a first edge portion and a second edge portion opposite to the first edge portion;

a hinge connecting the first edge portions of said case body and said cover so as to allow said cover to be opened and closed;

engaging means for engaging the second edge portion of said cover with the second edge portion of said case body with a gap therebetween;

urging means for urging the second edge portion of said cover away from the second edge portion of said case body so as to keep said gap constant in engagement of the second edge portions of said case body and said cover through said engaging means; and an inner wall provided on said cover at a given interval away from a preselected operating button on the electronic equipment put in said case body when said cover is closed, said inner wall depressing the preselected operating button when a load is provided to at least one of said case body and said cover so as to decrease the gap between the second edge portions of said case body and said cover.

2. A carrying case as set forth in claim 1, further comprising a hook provided on said cover which has a first end portion and a second end portion opposite to the first end portion, the first end portion being installed pivotably on said cover, the second end portion being spring-loaded into constant engagement with said cover.

3. A carrying case as set forth in claim 1, wherein said urging means is a spring member provided on the second edge portion of said cover.

4. A carrying case as set forth in claim 1, wherein said urging means is a spring member provided on the first end portions of said case body and said cover.

5. A carrying case as set forth in claim 1, wherein said inner wall has formed thereon a protrusion in alignment with and at a given interval away from the operating button of the electronic equipment stored within said case body.

6. A carrying case for electronic equipment comprising:

a case body having a bottom, a first side wall, and a second side wall opposite to the first side wall, the first side wall and the second side wall having a first edge portion and a second edge portion to define an opening opposite the bottom, said case body being designed to store therein the electronic equipment to be movable a given distance in a widthwise direction between the bottom and the opening;

a cover covering the opening of said case body, said cover having a first edge portion and a second edge portion opposite to the first edge portion;

a hinge connecting the first edge portions of said case body and said cover so as to allow said cover to be opened and closed;

engaging means for engaging the second edge portion of said cover with the second edge portion of said case body;

urging means for urging the electronic equipment stored within said case body against the bottom of said case body to hold the electronic equipment in said case body;

a window formed in the bottom of said case body to expose a portion of the electronic equipment stored in said case body to atmosphere; and an inner wall provided on said cover at a given interval away from a preselected operating button of the electronic equipment stored in said case body when said cover is closed, when a load is provided to the portion of the electronic equipment through said window to move the electronic equipment away from the bottom of said case body against pressure exerted by said urging means, the preselected operating button of the electronic equipment being brought into engagement with said inner wall so that the preselected operating button is depressed.

7. A carrying case as set forth in claim 6, wherein said urging means is a spring member provided on said engaging means which provides a spring load to a portion of the electronic equipment to hold the electronic equipment in said case body when the second edge portion of said cover engages the second edge portion of said case body.

8. A carrying case as set forth in claim 6, wherein said inner wall has formed thereon a protrusion in alignment with and at a given interval away from the operating button of the electronic equipment stored within said case body.

\* \* \* \* \*